United States Patent [19]

Goodfriend et al.

[11] 4,061,026
[45] Dec. 6, 1977

[54] FULL THROTTLE, SPECIFIC SPEED TESTS IN INTERNAL COMBUSTION ENGINE DIAGNOSTICS

[75] Inventors: Harvey J. Goodfriend, Simsbury; Henry J. Mercik, Jr.; Lee R. Armstrong, both of Enfield, all of Conn.

[73] Assignee: United Technologies Corporation, Hartford, Conn.

[21] Appl. No.: 684,329

[22] Filed: May 7, 1976

[51] Int. Cl.² .............................................. G01L 3/00
[52] U.S. Cl. ................................................... 73/116
[58] Field of Search ..................... 73/116, 117.3, 118, 73/119, 168; 324/16 R, 161; 235/150.2, 150.3; 340/239 F; 116/114 AE

[56] References Cited

U.S. PATENT DOCUMENTS

| | | | |
|---|---|---|---|
| 2,499,494 | 3/1950 | Greer | 340/239 F |
| 2,612,777 | 10/1952 | Greer | 73/168 |
| 3,937,087 | 2/1976 | Heggie | 73/398 AR |
| 3,955,135 | 5/1976 | Fastaia | 324/16 R |
| 3,964,301 | 6/1976 | Hanson et al. | 73/116 |

*Primary Examiner*—James J. Gill
*Assistant Examiner*—Anthony V. Ciarlante
*Attorney, Agent, or Firm*—M. P. Williams

[57] ABSTRACT

Diagnosing an internal combustion engine includes full throttle, specific speed tests such as measuring fuel pressure at two checkpoint speeds and at rated speed, and determining the pressure and speed where the governor reduces fuel pressure, an aneroid checkpoint of fuel pressure as a function of engine speed, and a fuel inlet restriction test, all without a dynomometer. The tests are performed with the throttle wide open, so that pressure can be measured downstream of the throttle at accessible taps, and/or to provide maximum fuel-flow test conditions. The speed comparisons are made during an acceleration with the throttle fully open, the instantaneous speed of which is accurately determined by flywheel tooth sensing. The speeds at which the specification pressure is to be checked is determined by comparing indications related to specification speeds expressed in terms of elapsed time between teeth of the flywheel, for a flywheel having the total number of teeth of the engine under test, rather than requiring full comparisons with actual speed expressed in terms of revolutions per minute.

11 Claims, 5 Drawing Figures

FULL THROTTLE, SPECIFIC SPEED TESTS IN INTERNAL COMBUSTION ENGINE DIAGNOSTICS

CROSS REFERENCE TO RELATED APPLICATIONS

Some of the subject matter disclosed herein is disclosed and claimed in a commonly owned copending application filed on even date herewith by Willenbecher et al, Ser. No. 684,036 entitled SPEED-RELATED INDICATION COMPARISONS IN INTERNAL COMBUSTION ENGINE DIAGNOSTICS; and the subject matter hereof is preferably used in conjunction with the subject matter disclosed in a commonly owned copending application filed on even date herewith by Stick et al, Ser. No. 684,037 entitled DETERMINATION OF NUMBER OF TEETH ON AN INTERNAL COMBUSTION ENGINE FLYWHEEL.

BACKGROUND OF THE INVENTION

1. Field of the Invention

This invention relates to diagnosing internal combustion engines electronically.

2. Description of the Prior Art

In internal combustion engines, proper operation is related to delivery of fuel at proper pressures as a function of engine speed, and as a function of intake manifold pressure. Particularly in the case of diesel engines, the speed of the engine may be controlled by fuel pressure, and overfueling of the engine, which can result in excessive smoke and possible engine damage, is prevented by reducing fuel pressure at the inlet to the engine whenever an inadequate air intake pressure exists.

In diesel engines, it has long been known to check fuel pumps against certain operating standards, particularly to check the pressure of fuel delivered by the fuel pump at the fuel inlet rail for various speeds of the engine (which are herein referred to as the first and second checkpoints and the rated point) and the point at which the governor limits the fuel pressure to avoid excessive engine speed (called cut-off). However, in the prior art it has been common to remove the fuel pump from the engine and mount it on a specially designed test rig in order to operate the pump at desired speeds in a steady state condition, and monitor the pressure developed by the pump at those desired speeds. This in turn necessitates an excessive amount of labor in removing the fuel pump from the engine, as well as incurring the potential for inadvertently causing additional problems as a result of the mechanical steps involved in the pump removal and reinstallation procedures.

A seemingly small, but practically troublesome aspect in analyzing fuel system is the point at which rail fuel pressure is to be measured. If the pressure measurement is to reflect the pressure of the fuel pump itself, it must be in full fluid communication therewith; this is particularly true where the fuel pressure is to be measured under high fueldelivery conditions. On many engines, it is extremely difficult and impractical to measure fuel pressure upstream of the throttle. In order to provide adequate pressure measurements, the throttle must therefore be fully open for on-engine fuel diagnostics. Also, the pump should be tested under full flow conditions. Obviously, a vehicle-mounted engine responding to a fully open throttle will simply advance from low idle to governor-controlled cut-off speed, at a very rapid rate, which renders the measurement of fuel pressures at designated, specification speeds impossible. To overcome this, it has been known to make open-throttle, steady speed fuel pressure measurements of an engine mounted on a vehicle which is standing on a dynomometer. As is known, the dynomometer rotates with the power driving wheels of the vehicle, and can be loaded in a controlled fashion from no load (simulating a slight downgrade) to full load (simulating a fully loaded vehicle climbing a hill). Thus, the dynomometer load can be adjusted to hold the desired specification speed under full power, with the throttle wide-open. However, a dynomometer is a very cumbersome and expensive test stand, and is frequently totally unavailable where vehicle or engine diagnosis is required.

There are other examples of the need to perform open throttle tests at specified speeds. An aneroid fuel pressure control is normally tested at at least one speed to determine the manner in which fuel pressure varies with speed when the pressure is also controlled by the aneroid. However, as in the case of fuel pressure tests relating to the fuel pump and other portions of the fuel system, if on-engine testing is to be performed, it must be done with a full throttle in order to permit measuring the fuel pressure, and without a dynomometer to load the engine, full throttle will cause rapid acceleration from idle to governor cut-off, with no ability to carefully limit operation to a desired speed. A further example is in the testing of the fuel inlet pressure (the pressure at the upstream end of the fuel pump, downstream from a fuel filter), the measure of which compared against ambient pressure is an indication of the degree of restriction. But the degree of restriction as indicated by pressure is also a function of the amount of fuel flowing; therefore full flow pressure is required as a test of the fuel inlet restriction. In order to achieve full fuel flow, the throttle must be open; and, without a dynomometer, the apparatus will simply accelerate to governor cut-off speed at which point the governor will reduce the fuel pressure to a very low amount, thereby rendering the inlet fuel restriction test impossible to perform.

SUMMARY OF THE INVENTION

Objects of the invention include open throttle and full fuel-flow measurements of engine parameters without the need of a dynomometer, and improvements in internal combustion engine fuel pump and other fuel system measurements.

According to the present invention, measurements of parameters on an internal combustion engine are made at specified speeds, during full throttle operation of the engine, by allowing acceleration of the engine to occur while repetitively measuring indications of engine speed and measuring the speed-related parameters in response to indications that the engine has reached the specified speed for the measurement.

According to one aspect of the invention, analysis of a fuel system, including fuel pump pressure measurements as a function of speed, are made with the fuel pump on-engine, downstream of the throttle, with the throttle open, by continuously monitoring an indication of speed and sampling fuel pressure in response to sensing a desired related speed of the engine.

According to another aspect of the invention, the aneroid pressure regulator of a diesel engine is checked by measuring fuel pressure at a specification speed with the aneroid operating, the fuel pressure being measured downstream of the throttle while the engine is accelerating in a full fuel, open throttle condition, by continuous measurement of a speed indication and measuring fuel pressure in response to an indication of the desired speed.

In accordance with another aspect of the invention, measurement of fuel inlet restrictions under full fuel flow conditions is achieved by measuring a pressure at the inlet to the fuel pump of an internal combustion engine while the engine is accelerating in an open throttle condition, while continuously monitoring indications of speed, and measuring the fuel pressure at the inlet to the fuel pump when the speed indications indicate substantially maximum speed below which the governor will reduce fuel pressure automatically as a function of speed.

The invention provides capability of monitoring a variety of engine parameters while operating the engine under open throttle conditions, without the need of a dynomometer. The invention further provides on-engine analysis of the fuel system of an internal combustion engine by monitoring pressures at stated speeds, without the need to maintain steady-state speed conditions. The invention permits onengine diagnosis of the fuel system of an internal combustion engine by monitoring pressures downstream of the throttle, without the need of a dynomometer. The invention provides full fuel flow conditions while monitoring speed-related parameters of the engine, without the need of a dynomometer.

In its broadest sense, the invention permits separating the requirement for the measurement of certain parameters at given speeds from the need to either operate the engine under steady state speed conditions (which heretofore has been obtainable only by means of a dynomometer) or operate the engine components off-engine on a test stand.

Other objects, features and advantages of the present invention will become more apparent in the light of the following detailed description of preferred embodiments thereof, as illustrated in the accompanying drawing.

DESCRIPTION OF THE PREFERRED EMBODIMENTS

Figure 1:
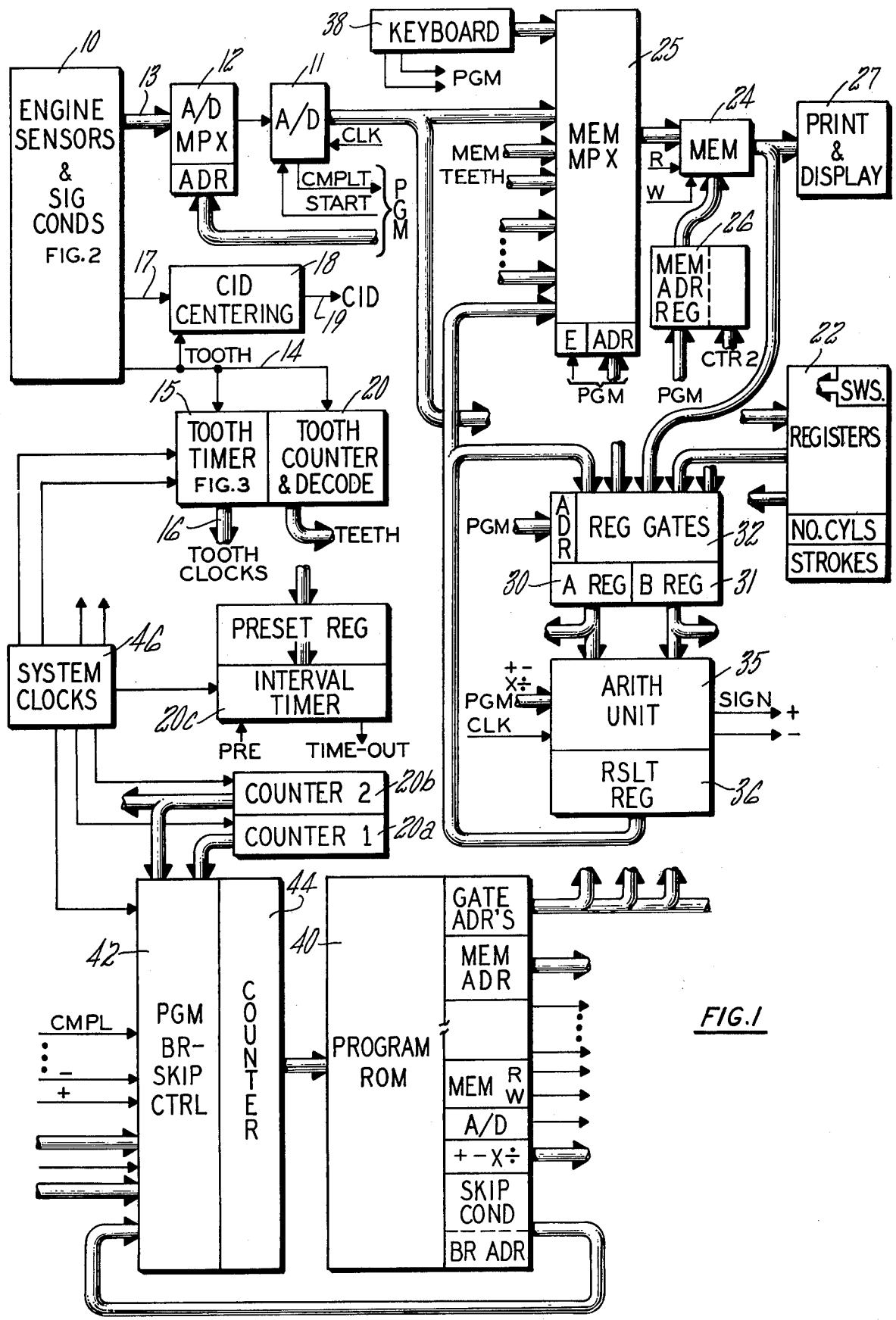
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an internal timer 20c, and special purpose registers 22, which may be used (as an alternative to memory) to retain cretain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shwon for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be supplied thereto, if any. The memory 24 is responsive to a memory address register 26 which may respond to a counter used in program control in a usual fashion. The output of the memory is available to other portions of the data flow, such as print and display apparatus 27 and the arithmetic apparatus including aritmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, substract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditioned branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA ad PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
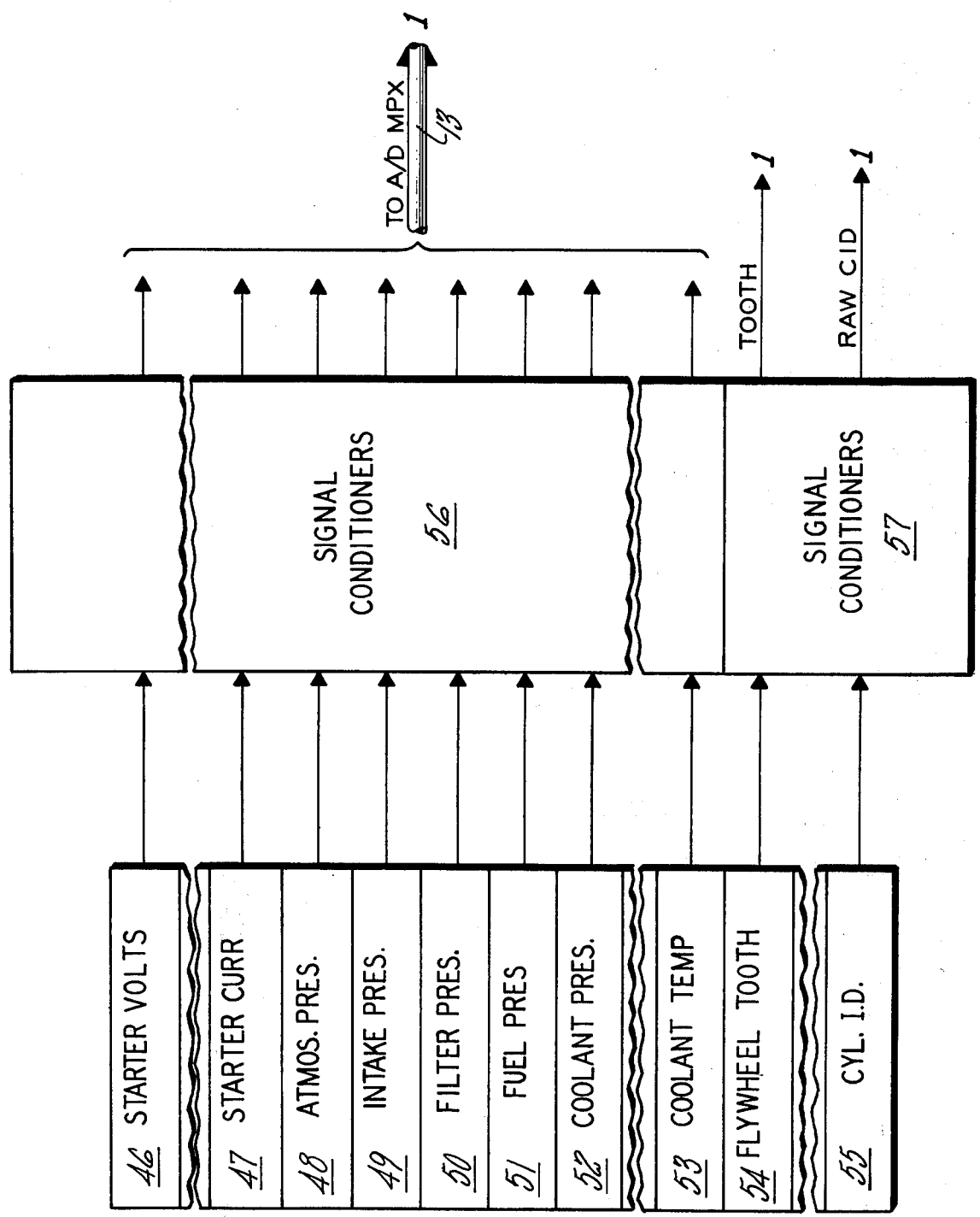
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
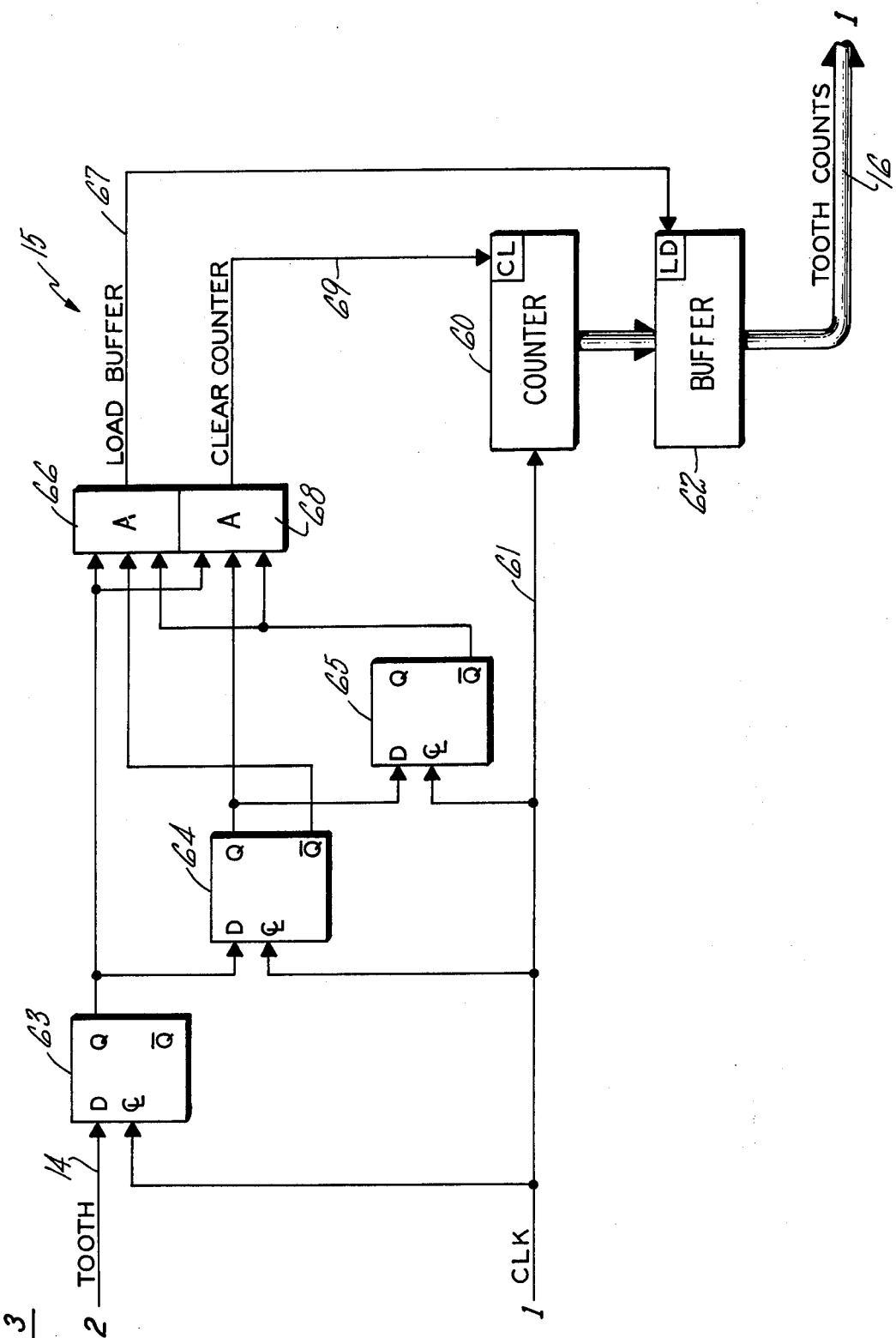
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere form tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63-65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth in a commonly owned copending application of Stick et al, Ser. No. 684,037, entitled "Determination of Number of Teeth on an Internal Combustion Engine Flywheel". Other abbreviations include: "RSLT"=result register; "MEM"= memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

Figure 4:
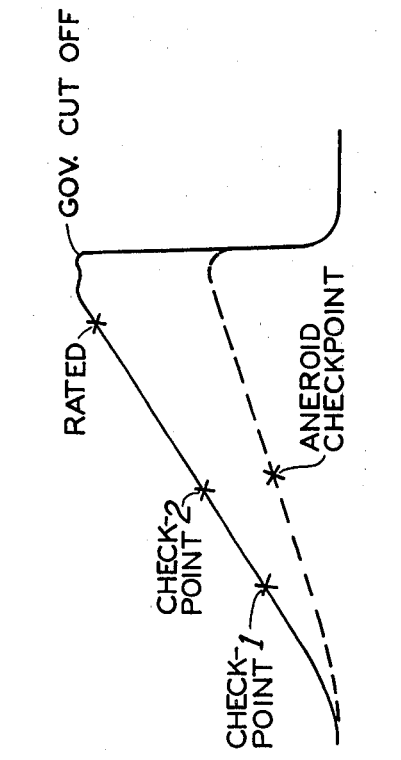
FIG. 4 is a diagrammatic illustration of principles of the invention.

Referring now to FIG. 4, several of the full-throttle, specific speed tests of the present invention, relating to fuel system health, are illustrated. In a first test, the aneroid is defeated so that it will not limit fuel supplied to the engine during a snap acceleration, and fuel pressure is measured at three speeds (checkpoint one, checkpoint two, and rated speed) as determined by manufacturer's specifications for the given fuel system. In addition, the speed at which the governor cut off comes into play to limit engine speed is determined by measuring the maximum pressure before the pressure starts to trail off.

In a second test, the aneroid is reconnected, and the fuel pressure is measured at about halfway between low idle and high idle speeds, as illustrated in FIG. 4. A third test, not illustrated in FIG. 4, measures the restrictive effect of the fuel filter by measuring the pressure downstream of the fuel filter but upstream of the fuel pump, when in a full fuel flow condition, which is taken herein to be rated speed.

Figure 5:
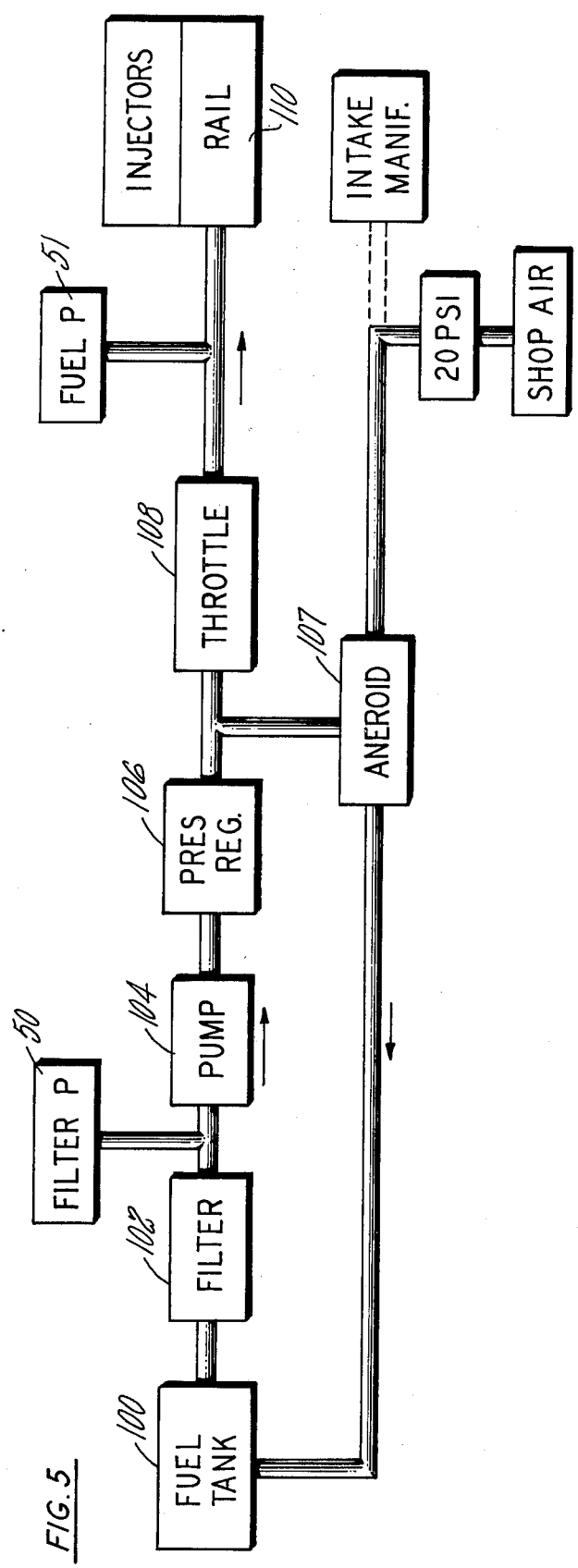
FIG. 5 is a simplified block diagram of the fuel system of an engine with probes which may be used in a diagnostic system incorporating the invention.

Referring to FIG. 5, a fuel tank 100 feeds a fuel filter 102 which feeds a fuel pump 104, which is typically a gear-type pump. Between the filter 102 and the pump 104, the filter pressure transducer 50 is tapped in. From the pump 104, the fuel passes through a pressure regulator 106, which is typically formed as an integral part of the fuel pump. From the fuel pressure regulator, a bypass is provided through an aneroid 107 back to the tank 100 to bypass fuel in a manner which is inverse to the intake manifold air pressure, as is known in the art. In other words, when there is little air pressure provided by the turbocharger at the intake manifold, then less fuel is allowed to pass to the throttle 108. Downstream of the throttle 108, at the fuel injector inlet rail 110 the fuel pressure transducer 51 is tapped in. The arrangement of FIG. 5 is not critical to the invention, however FIG. 5 is illustrative of certain of the problems relating to full fuel, specific speed tests, and more particularly to problems which may be encountered in diagnosing the health of a fuel system, all as is described hereinbefore.

The speed measurements herein are made by the tooth timer, which senses the passage of teeth and records a count of the number of clock signals fed to a counter on a tooth-to-tooth basis. The number of ringgear teeth can be determined from manufacturer's specifications and provided in either a register or a predetermined location in memory prior to the test. Or, if desired, the teachings of the aforementioned Stick et al application may be utilized to determine the number of ringgear teeth (RGT) on the flywheel and have that available in memory; none of this forms any part of the present invention. The fraction of a revolution traversed as each tooth passes the sensor is simply the ratio of one divided by the total number of teeth. The time for that fraction of a revolution to occur is simply the counts of the interval timer divided by the frequency of clock signals fed to the interval timer. Since frequency of the clock feeding the counter is expressed in Hz, and speed is normally expressed in revolutions per minute, a factor of 60 must be employed in a well known fashion.

To actually determine the speed from the counts provided by the tooth counter the relationship is the ratio of one tooth to the total number of teeth, which is divided by the ratio of the counts to the frequency (the frequency in turn having to be first divided by 60 to yield a result in rpm's). Rewritten this results in the frequency of the clock times 60, all of which is divided by the total number of flywheel teeth times the counts in the timer. This may be predetermined as a speed factor, so that any time a speed reading is required (such as at governor cut off herein), it can be taken simply by dividing the speed factor by the number of counts in the timer, according to the following instructions:

1. Load MEM (Freq) to A REG
2. Load MEM (RGT) to B REG
3. Divide
4. Load RSLT to A REG
5. Load 60 Factor to B REG
6. Multiply
7. Load RSLT to MEM (Spd Factor)

On the other hand, when comparing the actual speed of the engine as determined by the tooth timer with predetermined speeds (such as checkpoints one and two, and rated speed herein) one can reverse the position of speed and counts in the relationships described hereinbefore and determine in advance the number of counts which the tooth timer will have when the engine has a predetermined speed. This is done generally by multiplying the frequency of the clock times 60, all of which is divided by the product of the total number of teeth on the flywheel and the desired starting speed in rpm. This can be accomplished in the exemplary diagnostic system of FIG. 1, assuming the specification speeds (checkpoint one, checkpoint two, and rated speed) are available in memory, with the following instructions:

8. Load MEM (Freq) to A REG
9. Load MEM (RGT) to B REG
10. Divide
11. Load RSLT to A REG
12. Load MEM (Check 1 Spd) to B REG
13. Divide
14. Load RSLT to A REG
15. Load 60 Factor to B REG
16. Multiply
17. Load RSLT to MEM (Check 1 Factor)

In a similar fashion, factors may be precomputed for checkpoint two and for rated speed as follows:

18. Load MEM (Freq) to A REG
19. Load MEM (RGT) to B REG
20. Divide
21. Load RSLT to A REG
22. Load MEM (Check 2 Spd) to B REG
23. Divide
24. Load RSLT to A REG
25. Load 60 Factor to B REG
26. Multiply
27. Load RSLT to MEM (Check 2 Factor)
28. Load MEM (Freq) to A REG
29. Load MEM (RGT) to B REG
30. Divide
31. Load RSLT to A REG
32. Load MEM (Rated Spd) to B REG
33. Divide
34. Load RSLT to A REG
35. Load 60 Factor to B REG
36. Multiply
37. Load RSLT to MEM (Rated Factor)

Then the system can simply monitor the tooth timer counts, continuously subtracting the tooth timer counts from the predetermined counts. Since counts become smaller and smaller as the speed increases, when the speed of the engine exceeds the predetermined speed, then the predetermined counts will exceed the tooth timer counts and this can be determined by doing a reverse subtract and looking for a negative result.

In the following, it is assumed that the fuel pressure test has a base address in memory, and the specific points being accommodated can be indexed with counter 2. Thus the checkpoint speeds, referred to instructions 8–37 hereinbefore, may have been stored at the base address with counter number 2 as the specific address for the checkpoint speed, such as (check 1 spd), as in instruction 12. Then, the factors could have been stored back into the same point simply by keeping track of the three factors by means of counter 2. This mode is illustrated in the instructions which follow, bearing in mind that the counter 2 address is now assumed to be the address where the check factors and rated factor are stored, and where the result will end up. However, separate addresses could be utilized, through programming techniques well known in the art.

This test must be performed with the engine accelerating, and it is obviously known when the engine is accelerating since the operator must press the throttle to cause the snap acceleration. Thus the operator will start the test, the preliminaries referred to hereinbefore will be performed as the operator pushes the throttle down, and as the accelerations actually begin, speed is monitored and pressure readings are taken; two speeds in excess of the rated speed being measured before the pressure reading is taken to be assured that a noise spike hasn't caused an erroneous sensing of the desired speed (the slight delay is inconsequential, due to commensurate delays in the reading of the fuel pressure as a consequence of long lines, analog signal filters and the like).

Since one of the full throttle, specific speed tests herein is measuring filter restriction at maximum fuel flow, the filter pressure transducer can be sampled at rated speed, and the results stored. This is done following rated speed fuel pressure, at instructions 56-60.

Exemplary instructions are:

38. Reset Counter 2
39. Reset Counter 1
40. Advance Counter 2
41. Load MEM (Ctr 2) to B REG
42. Load Tooth timer to A REG
43. Subtract
44. Skip two if-
45. Reset Counter 1
46. Branch to 42
47. Advance Counter 1
48. Skip 1 if Counter 1 = 2
49. Branch to 42
50. A/D MPX to Fuel Pres
51. Start A/D
52. Skip one if CMPLT
53. Branch to 52
54. Load A/D to MEM (Ctr 2)
55. Skip one if Counter 2 = 4
55a. Branch to 39
56. A/D MPX to Filter Pres
57. Start A/D
58. Skip one if CMPLT
59. Branch to 59
60. Load A/D to MEM (Filter Pres)

Once the pressure versus specific speed measurements have been made, the present invention can then provide a measure of the speed at which the governor cut-out reduces fuel pressure, thereby regulating the maximum speed of the engine. To do this, pressure is measured as fast as the A/D can measure it, although any short time interval could be included to delay if desired. For each pressure measurement made, the subsequent pressure measurement must be at least 2 psi (or such other factor as is determined upon in any implementation of the present invention) below the preceding measurement. Thus each measurement brought in is compared against the previous one less 2 psi, and then it has 2 psi subtracted from it for comparison with the next measurement, and so forth. When two measurements made in turn are 2 psi below the preceding measurement, the speed relating to the first such pressure is taken as the regulator speed, and this is saved for subsequent use. However, the pressure measurements made in this portion of the test are irrelevant.

Speed is measured in the manner described hereinbefore, utilizing the speed factor which has been stored in memory by instruction 7. To keep track of the speeds with each pressure measurement, since the desired speed won't be known until two additional pressure measurements are taken, and therefore at least three speeds must be available as the test proceeds towards the desired speed, a base address can be utilized in the fashion described hereinbefore with counter 2 used as an index address while counter 1 keeps track of the number of tests. In the exemplary process set out hereinafter, the first measurement made will be subtracted from −2 psi, since it will be made against no previous reading. However this will automatically fail the test so there is no problem. Thereafter legitimate testing is done in response to each loop through the subroutine, as follows:

61. Reset Counter 1
62. Reset Counter 2
63. Advance Counter 2
64. Start A/D
65. Load Tooth timer to MEM (Ctr 2)
66. Load 2 PSI Factor to B REG
67. Subtract
68. Load RSLT to B REG
69. Skip one if CMPLT
70. Branch to 67
71. Load A/D to A REG
72. Subtract
73. Skip two if -
74. Reset Counter 1
75. Branch to 63
76. Advance Counter 1
77. Skip one if Counter 1 = 2
78. Branch to 63
79. Load MEM (Ctr 2) to Print and Display Another full throttle, specific speed test which the present invention performs is sensing the fuel rail pressure at an aneroid checkpoint, as described previously with respect to FIG. 4. This utilizes the same pressure sensor, and is exactly the same as the checkpoint test performed hereinbefore. However, the aneroid defeat (shop air connected to the aneroid) should be removed and the aneroid connected to the intake manifold for proper operation. Since the loading of the engine is relatively light, during the snap acceleration used in the aneroid test, the amount of energy in the exhaust gas of the engine isn't sufficient to drive the turbocharger very hard, so that the intake manifold pressure remains relatively low throughout the snap acceleration. However, from one engine to the next, the aneroid checkpoint provides a very good test of the health of the aneroid by measuring fuel pressure at a speed which is roughly halfway between low idle and high idle, as illustrated in FIG. 4. Since only a single test need be made, the speed factor (as described with respect to instructions 8-37 hereinbefore) can simply be saved in the B register, and then the tooth timer can be compared therewith as follows:

80. Load MEM (Freq) to A REG
81. Load MEM (RGT) to B REG
82. Divide
83. Load RSLT to A REG
84. Load MEM (Aner Spd) to B REG
85. Divide
86. Load RSLT to A REG
87. Load 60 Factor to B REG
88. Multiply
89. Load RSLT to B REG
90. Reset Counter 1
91. Load Tooth timer to A REG
92. Subtract
93. Skip one if -
94. Branch to 91 when the speed is actually sensed, all that is required is simply to store the pressure at the fuel rail at that point in time (in the same fashion as described hereinbefore), exemplary instructions for which are:

95. Advance Counter 1
96. Skip 1 if Counter 1 = 2
97. Branch to MEM 91
98. A/D MPX to Fuel Pres
99. Start A/D
100. Skip one if CMPLT
101. Branch to 100
102. Load A/d to (Aner Spd)

Although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which we claim as new and desire to secure by Letters Patent is:

1. Apparatus for testing an internal combustion engine while operating under open throttle conditons without the need of a dynomometer, comprising:

transducer means adapted to be disposed for response to an engine-related parameter, a measurement of which is desired with the engine operating under open throttle conditions;

speed sensing means adapted to be disposed to sense rotation of the engine under test through an angular increment which is substantially less than a revolution of the engine as related to time in a fashion to provide an indication of speed on a sub-revolution basis; and processing means responsive to said speed means for successively monitoring the speed indication provided by said speed sensor means as said engine is accelerating and, in response to said indications indicating that the engine has reached a speed in excess of a predetermined speed, sampling the output of said transducer means.

2. Apparatus according to claim 1 wherein said processing means includes means for registering an indication of a predetermined speed and means for continuously comparing said predetermined speed indication with said engine speed indications successively presented by said speed means.

3. Apparatus according to claim 2 wherein said predetermined speed indication is an indication of substantially the maximum speed of the engine below governor cut-off speed.

4. Apparatus according to claim 3 wherein said predetermined speed indication is an indication of rated engine speed.

5. Apparatus according to claim 2 wherein said speed indication is one of a plurality of checkpoint speeds included in the speed-pressure specification of the fuel pump of the engine, and wherein said transducer means comprises a fuel pressure transducer disposed downstream of a throttle in the fuel pressure system of said internal combustion engine.

6. Apparatus according to claim 2 wherein said speed indication is a checkpoint speed included in the speed-pressure specification of the aneroid of the engine, and wherein said transducer means comprises a fuel pressure transducer disposed downstream of a throttle in the fuel pressure system of said internal combustion engine.

7. Apparatus according to claim 1 wherein said transducer comprises a fuel pressure transducer adapted to be disposed between the fuel inlet filter and the fuel pump inlet of an internal combustion engine and wherein said processing means includes means for registering the rated speed of said engine and providing said predetermined indication in response thereto, the apparatus thereby providing a measure of the pressure rise from ambient across the inlet filter of a fuel system while said fuel system is delivering substantially maximum fuel.

8. In the method of making speed-regulated measurements of parameters of an internal combustion engine while the engine is operating under open throttle conditions, the steps of:
operating the engine with the throttle wide open and allowing the engine to accelerate from idle to its maximum unloaded speed;
continuously monitoring the speed of the engine by sensing a speed indication derived from a moving member on said engine;
continuously comparing the speed indications as provided with test speed indications indicative of speeds at which the parameter of the engine is to be measured; and
measuring the parameter of said engine in response to said comparisons indicating that the speed of the engine has reached the corresponding test speed.

9. Apparatus for testing an internal combustion engine while operating under open throttle conditions without the need of a dynomometer, comprising:
a fuel pressure transducer means disposed downstream of the throttle in the fuel pressure system of said internal combustion engine;
speed sensing means adapted to be disposed to sense rotation of the engine under test through an angular increment which is substantially less than a revolution of the engine as related to time in a fashion to provide an indication of speed on a sub-revolution basis; and
processing means responsive to said speed means and to said transducer for successively monitoring the speed indications provided by said speed sensor means and the output of said transducer as said engine is accelerating and for determining in response thereto the speed at which the pressure in the fuel system is maximum.

10. In the method of making speed-related measurements of parameters of an internal combustion engine fuel system, the steps of:
operating the engine with the throttle wide open and allowing the engine to accelerate from idle to its maximum unloaded speed;
determining the maximum fuel pressure of the engine as it accelerates; and
sensing the speed of the engine at which maximum fuel pressure is sensed.

11. In the method of measuring fuel pump inlet restriction of an internal combustion engine under full fuel flow conditions, the steps of:
operating the engine with the throttle wide open and allowing the engine to accelerate from idle to its maximum unloaded speed;
continuously monitoring the speed of the engine by sensing a speed indication derived from a moving member on said engine;
continuously comparing the speed indications as provided with a speed indication indicative of substantially the maximum rated speed; and
measuring the pressure at the inlet to the fuel pump of said engine in response to said comparisons indicating that the speed of the engine has reached substantially the maximum rated speed.

* * * * *

UNITED STATES PATENT AND TRADEMARK OFFICE
CERTIFICATE OF CORRECTION

PATENT NO. : 4,061,026
DATED : December 6, 1977
INVENTOR(S) : Harvey J. Goodfriend; Henry J. Mercik, Jr.; Lee R. Armstrong It is certified that error appears in the above-identified patent and that said Letters Patent are hereby corrected as shown below:

| | |
|---|---|
| Column 1, line 56 | "analyzing fuel system" should read --analyzing a fuel system-- |
| Column 1, line 61 | "fueldelivery" should read --fuel-delivery-- |
| Column 3, line 25 | "onengine" should read --on-engine-- |
| Column 4, line 43 | "internal" should read --interval-- |
| Column 4, line 45 | "cretain" should read --certain-- |
| Column 4, line 60 | "shwon" should read --shown-- |
| Column 5, line 5 | "supplied" should read --applied-- |
| Column 5, line 51 | "unconditioned" should read --unconditional-- |

UNITED STATES PATENT AND TRADEMARK OFFICE
CERTIFICATE OF CORRECTION

PATENT NO. : 4,061,026
DATED : December 6, 1977
INVENTOR(S) : Harvey J. Goodfriend; Henry J. Mercik, Jr.; Lee R. Armstrong It is certified that error appears in the above-identified patent and that said Letters Patent are hereby corrected as shown below:

Column 6, line 9   "ad" should read --and--

Column 12, line 33   "to MEM 91" should read --to 91--

Column 12, line 38   "Load A/d to (Aner Spd)" should read --Load A/D to MEM (Aner Spd)--

Signed and Sealed this

Eighth Day of August 1978

[SEAL]

Attest:

RUTH C. MASON
*Attesting Officer*

DONALD W. BANNER
*Commissioner of Patents and Trademarks*